United States Patent
Ashbrook et al.

(10) Patent No.: US 10,445,618 B2
(45) Date of Patent: *Oct. 15, 2019

(54) STORING INFORMATION FOR ACCESS USING A CAPTURED IMAGE

(71) Applicant: Mobile Acuity Limited, Edinburgh (GB)

(72) Inventors: Anthony Peter Ashbrook, Edinburgh (GB); Mark William Wright, Edinburgh (GB)

(73) Assignee: Mobile Acuity Limited, Edinburgh (GB)

( * ) Notice: Subject to any disclaimer, the term of this patent is extended or adjusted under 35 U.S.C. 154(b) by 290 days.

This patent is subject to a terminal disclaimer.

(21) Appl. No.: 15/634,283

(22) Filed: Jun. 27, 2017

(65) Prior Publication Data

US 2017/0293822 A1  Oct. 12, 2017

Related U.S. Application Data

(63) Continuation of application No. 14/955,163, filed on Dec. 1, 2015, now Pat. No. 9,715,629, which is a (Continued)

(30) Foreign Application Priority Data

Feb. 11, 2005 (GB) .................... 0502844.4

(51) Int. Cl.
*G06K 9/60* (2006.01)
*G06K 9/62* (2006.01)
(Continued)

(52) U.S. Cl.
CPC .......... *G06K 9/6202* (2013.01); *G06F 16/58* (2019.01); *G06K 9/00671* (2013.01); *G06K 9/62* (2013.01);
(Continued)

(58) Field of Classification Search
CPC ............. H04N 1/2187; H04N 1/32101; H04N 1/00244; H04N 1/2191; H04N 2201/0084;
(Continued)

(56) References Cited

U.S. PATENT DOCUMENTS

| 4,876,643 A | 10/1989 | McNeill et al. ............... 710/110 |
| 5,436,653 A | 7/1995 | Ellis et al. ...................... 725/22 |

(Continued)

FOREIGN PATENT DOCUMENTS

| DE | 10245900 A1 | 4/2004 |
| EP | 0 944 019 A2 | 9/1999 |

(Continued)

OTHER PUBLICATIONS

Vlahakis, V. et al.; "ARCHEOGUIDE: First results of an Augmented Reality, Mobile Computing System in Cultural Heritage Sites"; VAST '01, Proceedings of the 2001 conference on Virtual reality, archeology, and cultural heritage; 2001; pp. 131-140; ACM, New York, NY.

(Continued)

*Primary Examiner* — Manav Seth
(74) *Attorney, Agent, or Firm* — Harrington & Smith

(57) ABSTRACT

An electronic device associates first information and at least a first portion of a first image, and uses a second image that includes a portion corresponding to at least the first portion of the first image to access the associated first information.

23 Claims, 6 Drawing Sheets

Related U.S. Application Data continuation of application No. 11/884,106, filed as application No. PCT/GB2006/000492 on Feb. 10, 2006, now Pat. No. 9,219,840.

(51) Int. Cl.

| | |
|---|---|
| G06F 16/58 | (2019.01) |
| H04N 1/00 | (2006.01) |
| H04N 1/21 | (2006.01) |
| H04N 1/32 | (2006.01) |
| G06K 9/00 | (2006.01) |
| H04N 5/76 | (2006.01) |

(52) U.S. Cl.
CPC ....... *H04N 1/00244* (2013.01); *H04N 1/2187* (2013.01); *H04N 1/2191* (2013.01); *H04N 1/32101* (2013.01); *H04N 5/76* (2013.01); *H04N 1/00307* (2013.01); *H04N 2201/0084* (2013.01); *H04N 2201/3225* (2013.01); *H04N 2201/3253* (2013.01); *H04N 2201/3254* (2013.01)

(58) Field of Classification Search
CPC ... H04N 2201/3225; H04N 2201/3253; H04N 2201/3254; H04N 1/00307; H04N 5/76; G06F 16/58; G06F 17/30265; G06K 9/00671; G06K 9/62; G06K 9/6202
See application file for complete search history.

(56) References Cited

U.S. PATENT DOCUMENTS

| | | | | |
|---|---|---|---|---|
| 5,504,518 | A | 4/1996 | Ellis et al. | 725/22 |
| 5,911,139 | A | 6/1999 | Jain et al. | 707/3 |
| 5,915,038 | A | 6/1999 | Abdel-Mottaleb et al. | 382/209 |
| 5,918,223 | A | 6/1999 | Blum et al. | 707/1 |
| 5,926,116 | A | 7/1999 | Kitano et al. | 340/988 |
| 5,933,548 | A * | 8/1999 | Morisawa | G06F 16/58 382/305 |
| 5,991,429 | A | 11/1999 | Coffin et al. | 382/118 |
| 6,292,575 | B1 | 9/2001 | Bortolussi et al. | 382/118 |
| 6,307,568 | B1 | 10/2001 | Rom | 345/629 |
| 6,370,629 | B1 | 4/2002 | Hastings et al. | 711/163 |
| 6,381,365 | B2 | 4/2002 | Murakawa | 382/190 |
| 6,424,727 | B1 | 7/2002 | Musgrave et al. | 382/117 |
| 6,456,234 | B1 | 9/2002 | Johnson | 342/357.09 |
| 6,522,889 | B1 | 2/2003 | Aarnio | |
| 6,535,637 | B1 | 3/2003 | Wootton et al. | 382/190 |
| 6,720,968 | B1 | 4/2004 | Butler et al. | 345/535 |
| 6,741,864 | B2 | 5/2004 | Wilcock et al. | 455/456.1 |
| 6,763,148 | B1 | 7/2004 | Sternberg et al. | 382/293 |
| 6,786,405 | B2 | 9/2004 | Wiedenhoefer | |
| 6,956,671 | B2 | 10/2005 | Monty et al. | 358/1.9 |
| 7,016,532 | B2 | 3/2006 | Boncyk | |
| 7,043,474 | B2 | 5/2006 | Mojsilovic | |
| 7,099,860 | B1 | 8/2006 | Liu | |
| 7,100,824 | B2 | 9/2006 | Ostrowski et al. | 235/383 |
| 7,233,684 | B2 | 6/2007 | Fedorovskaya et al. | 382/118 |
| 7,374,536 | B1 | 5/2008 | Taylor | 600/300 |
| 7,761,466 | B1 | 7/2010 | Eshghi | 707/772 |
| 7,770,013 | B2 | 8/2010 | Rhoads et al. | 713/176 |
| 8,150,164 | B2 | 4/2012 | Oh et al. | 382/190 |
| 8,165,306 | B2 * | 4/2012 | Miura | G11B 27/102 348/515 |
| 8,755,837 | B2 | 6/2014 | Rhoads et al. | 455/556.1 |
| 9,219,840 | B2 | 12/2015 | Ashbrook | |
| 9,418,294 | B2 | 8/2016 | Ashbrook | |
| 2001/0038718 | A1 | 11/2001 | Kumar et al. | 382/284 |
| 2002/0004795 | A1 | 1/2002 | Squibbs | 707/3 |
| 2002/0075282 | A1 | 6/2002 | Vetterli et al. | 345/632 |
| 2002/0102966 | A1 | 8/2002 | Lev | |
| 2002/0103813 | A1 | 8/2002 | Frigon | 707/104.1 |
| 2002/0113757 | A1 | 8/2002 | Hoisko | 345/8 |
| 2002/0138481 | A1 | 9/2002 | Aggarwal et al. | 707/6 |
| 2002/0154820 | A1 | 10/2002 | Kaneko et al. | 382/209 |
| 2002/0187774 | A1 | 12/2002 | Ritter et al. | 455/414 |
| 2003/0087650 | A1 | 5/2003 | Aarnio | 455/456 |
| 2003/0164819 | A1 | 9/2003 | Waibel | 345/173 |
| 2004/0151379 | A1 | 8/2004 | Kim et al. | 382/209 |
| 2004/0153649 | A1 | 8/2004 | Rhoads et al. | 713/176 |
| 2004/0202349 | A1 | 10/2004 | Erol et al. | 382/100 |
| 2004/0213437 | A1 | 10/2004 | Howard et al. | 382/115 |
| 2004/0264780 | A1 | 12/2004 | Zhang et al. | 382/224 |
| 2004/0268381 | A1 | 12/2004 | Simelius et al. | 725/19 |
| 2005/0113113 | A1 | 5/2005 | Reed | |
| 2005/0162523 | A1 | 7/2005 | Darrell et al. | 348/211.2 |
| 2006/0069681 | A1 | 3/2006 | Lauper | 707/6 |
| 2006/0114337 | A1 | 6/2006 | Rothschild | 348/231.3 |
| 2006/0158307 | A1 | 7/2006 | Lee et al. | 340/5.53 |
| 2006/0218115 | A1 | 9/2006 | Goodman et al. | 707/1 |
| 2006/0227992 | A1 | 10/2006 | Rathus et al. | 382/100 |
| 2006/0262352 | A1 | 11/2006 | Hull et al. | 358/1.18 |
| 2007/0071290 | A1 | 3/2007 | Shah et al. | 382/118 |
| 2007/0098219 | A1 | 5/2007 | Spence et al. | 382/103 |
| 2007/0104348 | A1 | 5/2007 | Cohen | 382/100 |
| 2007/0172155 | A1 | 7/2007 | Guckenberger | 382/305 |

FOREIGN PATENT DOCUMENTS

| | | |
|---|---|---|
| EP | 1301007 A2 | 4/2003 |
| EP | 1442417 | 8/2004 |
| EP | 1617365 A1 | 1/2006 |
| EP | 1 640 879 A1 | 3/2006 |
| GB | 2404749 A | 2/2005 |
| JP | 9-231244 | 9/1997 |
| JP | 2000-048199 | 2/2000 |
| JP | 2003-330953 | 11/2003 |
| JP | 2005107978 A | 4/2005 |
| WO | WO-03/032005 A2 | 4/2003 |
| WO | WO-03/041000 A1 | 5/2003 |
| WO | WO-2004/019256 A2 | 3/2004 |
| WO | WO-2004/038613 A1 | 5/2004 |
| WO | WO-2004/049130 A2 | 6/2004 |
| WO | WO-2004/057522 A1 | 7/2004 |
| WO | WO-2004/098220 A1 | 11/2004 |
| WO | WO-2006/085106 A1 | 8/2006 |
| WO | WO-2007/021996 A2 | 2/2007 |
| WO | WO-2007/104348 A1 | 9/2007 |
| WO | WO-2008/120041 A1 | 10/2008 |

OTHER PUBLICATIONS

Stricker, D. et al; "Augmented Reality for Visitors of Cultural Heritage Sites"; Proceedings of the International Conference on Artistic, Cultural and Scientific Aspects of Experimental Media Spaces; 2001; whole document (6 pages).

Vlahakis, V. et al.; "Archeoguide: An Augmented Reality Guide for Archaeological Sites"; Computer Graphics in Art History and Archaeology; Sep./Oct. 2002; pp. 52-60.

Stricker, D. et al.; "Design and Development Issues for ARCHEOGUIDE: An Augmented Reality based Cultural Heritage On-site Guide"; Proceedings of the International Conference on Augmented, Virtual Environments and Three-Dimensional Imaging; 2001; whole document (5 pages).

Kao, O. et al.; "Face Recognition using MMS-Mobile Devices"; Proceedings of the International Conference on Wireless Networks, ICWN '04, vol. 2 & Proceedings of the International Conference on Pervasive Computing and Communications, PCC'04; Jun. 21-24, 2004; Las Vegas, Nevada, USA; whole document (7 pages).

Gausemeier, J. et al.; "Development of a Real Time Image Based Object Recognition Method for Mobile AR-Devices"; AFRIGRAPH '03 Proceedings of the 2nd international conference on Computer graphics, virtual Reality, visualisation and interaction in Africa; 2003; pp. 133-139.

Tarumi, Hiroyuki, Ken Morishita, Yusuke Ito, and Yahiko Kambayashi, "Communication through virtual active objects overlaid onto the real world", In Proceedings of the third international conference on Collaborative virtual environments, pp. 155-164, ACM, 2000.

(56) References Cited

OTHER PUBLICATIONS

Jung, Il-Kyun, and Simon Lacroix, "A robust interest points matching algorithm", In Computer vision, 2001, ICCV 2001 Proceedings, Eighth IEEE International conference on, vol. 2, pp. 538-543, IEEE 2001.
"Computer Vision Library for Mobile Phones"; Augmented Reality; Dec. 23, 2004; whole document (1 page); URL: http://www.uni-weimar.de/~bimber/research.php.
Fruend, J. et al.; "AR-PDA: A Personal Digital Assistant for VR/AR Content"; from ASME 2002 International Design Engineering Technical Conferences and Computers and Information in Engineering Conference; Sep. 29-Oct. 2, 2002; whole document (3 pages).
Ke, Y. et al.; "PCT-SIFT: A More Distinctive Representation for Local Image Descriptors"; Computer Vision and Pattern Recognition; Apr. 2004; whole document (1 page).
Lowe, D.; "Distinctive Image Features from Scale-Invariant Keypoints"; Jan. 5, 2004; whole document (28 pages).
Hollerer, et al., "Mobile Augmented Reality", Chapter Nine, (Jan. 2004) 39 pgs.
Naaman, et al., "From Where to What: Metadata Sharing for Digital Photographs with Geographic Coordinates", Stanford University, 2005, 22 pgs.
Sarvas, et al., "Metadata Creation System for Mobile Images", 2004, 13 pgs.
"Random Sample Consensus: A Paradigm for Model Fitting with Applications to Image Analysis and Automated Cartography", Martin A. Fischler and Robert C. Bolles, Communications of the ACM, vol. 24, No. 6, Jun. 1981, pp. 381-395.
"Estimation—2D Projective Transformations", Richard Hartley and Andrew Zisserman, Multiple View Geometry in Computer Vision, 2d Edition, pp. 87-131.
"Distinctive Image Features from Scale-Invariant Keypoints", David G. Lowe, International Journal of Computer Vision 60(2), 2004, pp. 91-110.
Pan, J. et al.; "Automatic Image Captioning"; 2004; whole document (4 pages).
Baselinemag; "Viisage Technology: Face Invaders"; http://www.baselinemag.com/c/a/Projects-Security/Viisage-Technology-Face-Invaders; 2004; whole document (7 pages).
Lee, J.; "Software Learns to Tag Photos"; MIT Technology Review; Nov. 9, 2006; whole document (5 pages).
Arrington, M.; "First Screen Shots of Riya"; https://techcrunch.com/2005/10/26/riya-prepares-to-launch-alpha/; Oct. 26, 2005; whole document (9 pages).
Kirovski, D., et al.; "Spread-Spectrum Watermarking of Audio Signals"; 2003 IEEE Transactions on Signal Processing: Special Issue on Data Hiding; whole document (13 pages).
Chen, Y-S., et al.; "A Mobile Butterfly-Watching Learning System for Supporting Independent Learning"; © 2004 IEEE; whole document (8 pages).

\* cited by examiner

STORING INFORMATION FOR ACCESS USING A CAPTURED IMAGE

CROSS-REFERENCE TO RELATED APPLICATIONS

This application is a continuation of U.S. patent application Ser. No. 14/955,163, which is a continuation of U.S. patent application Ser. No. 11/884,106, which is the National Stage of International Application No. PCT/GB2006/000492, filed Feb. 10, 2006.

FIELD OF THE INVENTION

Embodiments of the present invention relate to storing information so that it can be accessed using a captured image.

BACKGROUND TO THE INVENTION

It may be desirable in certain circumstances to attach information to locations in the real world. This has previously been achieved by using barcodes or RFID tags attached to real world objects or by associating information with absolute positions in the world.

It would be desirable to provide an alternative mechanism by which information can be associated with real world locations and objects.

It would be desirable to provide a mechanism by which a user can 'leave' information at a real world location or object so that it can be 'collected' later by that user or another user.

BRIEF DESCRIPTION OF THE INVENTION

According to one aspect of a first embodiment there is provided an electronic device comprising:
means for associating first information and at least a first portion of a first image; and
means for using a second image that includes a portion corresponding to at least the first portion of the first image to access the associated first information.

It should be noted that a single electronic device comprises both means i.e. it is capable of both associating information with an image and using an image to access information. The information may be stored centrally, in which case, a plurality of such electronic devices are able to both place content using an image and retrieve content using an image, that is both placement and access to information is distributed.

The first information may be media such as an image, a video or an audio file or it may be, for example, an instruction for performing a computer function.

Correspondence between the portion of the second image and the first portion of the first image does not necessarily result in automatic access to the associated first information. The access may be conditional on other factors.

The first information may be pre-stored for access or dynamically generated on access.

According to another aspect of the first embodiment there is provided a method of storing information for future access by others comprising: associating first information and at least a first portion of a first image in a database controlled by a third party so that the first information can be accessed by others using a second image that includes a portion corresponding to at least the first portion of the first image.

According to another aspect of the first embodiment there is provided a system for storing information comprising: a server having a database that has a plurality of entries each of which associates one of a plurality of image portions with respective information; a first client device comprising a camera for capturing, at a first time, a first image that includes a first portion and means for enabling association, at the database, of the first portion with first information; and
a second client device comprising: a camera for capturing, at a second later time, a second image, which includes a portion corresponding to at least the first portion of the first image; means for using the second image to access, at the database, the associated first information; and output means for outputting the accessed first information.

The first portion may be the whole or a part of an area associated with the first image.

In implementations of this embodiment of the invention, features in a captured 'model' image are used to index information. Then if a later captured 'scene' image corresponds to a previously captured model image because some of the features in the captured 'scene' image are recognised as equivalent to some of the features of the model image, the information indexed by the corresponding model image is retrieved.

According to one aspect of a second embodiment there is provided a method for producing an homography that maps plural interest points of a first image with interest points in a second image, comprising:
a) generating a set of putative correspondences between interest points of the first image and interest points of the second image;
b) making a weighted sample of correspondences from the generated set;
c) computing an homography for the sampled correspondences;
d) determining the support for that homography from the generated set;
e) repeating steps c) to d) multiple times; and
f) selecting the homography with the most support.

According to another aspect of the second embodiment there is provided a method for producing an homography that maps a plural interest points of a first image with interest points of at least one of a plurality of second images, comprising:
a) generating a set of putative correspondences between interest points of the first image and interest points of a second image;
b) making a weighted sample of correspondences from the generated set where the probability of sampling a particular putative correspondence depends upon a measure of probability for the interest point of the second image defining that particular putative correspondence;
c) computing an homography for the sampled correspondences;
d) determining the support for that homography from the generated set;
e) repeating steps c) to d) multiple times;
f) changing the second image and returning to step a), multiple times;
g) selecting the second image associated with the homography with the most support;
h) updating the measure of probability for each of the interest points of the selected second image that support the homography associated with the selected second image.

According to one aspect of a third embodiment there is provided a method for producing an homography that maps a significant number of interest points of a first image with interest points in a second image, comprising:
a) generating a set of putative correspondences between interest points of the first image and interest points of the second image;
b) making a sample of correspondences from the generated set;
c) computing an homography for the sampled correspondences;
d) determining the support for that homography from the generated set;
e) repeating steps c) to d) multiple times;
f) selecting the homography with the most support; and
g) verifying the homography by verifying that the first and second images match.

According to one aspect of a fourth embodiment there is provided a method for producing an homography that maps plural interest points of a first image with interest points in a second image, comprising:
a) generating a set of putative correspondences between interest points of the first image and interest points of the second image;
b) making a sample of correspondences from the generated set;
c) computing an homography for the sampled correspondences;
d) determining the support for that homography from the generated set by determining the cost of each putative correspondence, wherein the cost of a putative correspondence is dependent upon statistical parameters for the interest point of the second image defining that putative correspondence;
e) repeating steps c) to d) multiple times; and
f) selecting the homography with the most support.
g) updating the statistical parameters for the interest points of the second image in dependence upon the cost of the putative correspondences under the selected homography.

According to another aspect of the fourth embodiment there is provided a method for producing an homography that maps a plural interest points of a first image with interest points of at least one of a plurality of second images, comprising:
a) generating a set of putative correspondences between interest points of the first image and interest points of a second image;
b) making a sample of correspondences from the generated set;
c) computing an homography for the sampled correspondences;
d) determining the support for that homography from the generated set by determining the support from each putative correspondence, wherein the support from a putative correspondence is dependent upon statistical parameters for the interest point of the second image defining that putative correspondence;
e) repeating steps c) to d) multiple times;
f) changing the second image and returning to step a), multiple times;
g) selecting the second image associated with the homography with the most support;
h) updating the statistical parameters for the interest points of the selected second image

BRIEF DESCRIPTION OF THE DRAWINGS

For a better understanding of the present invention reference will now be made by way of example only to the accompanying drawings in which.

DETAILED DESCRIPTION OF EMBODIMENT(S) OF THE INVENTION

Figure 1:
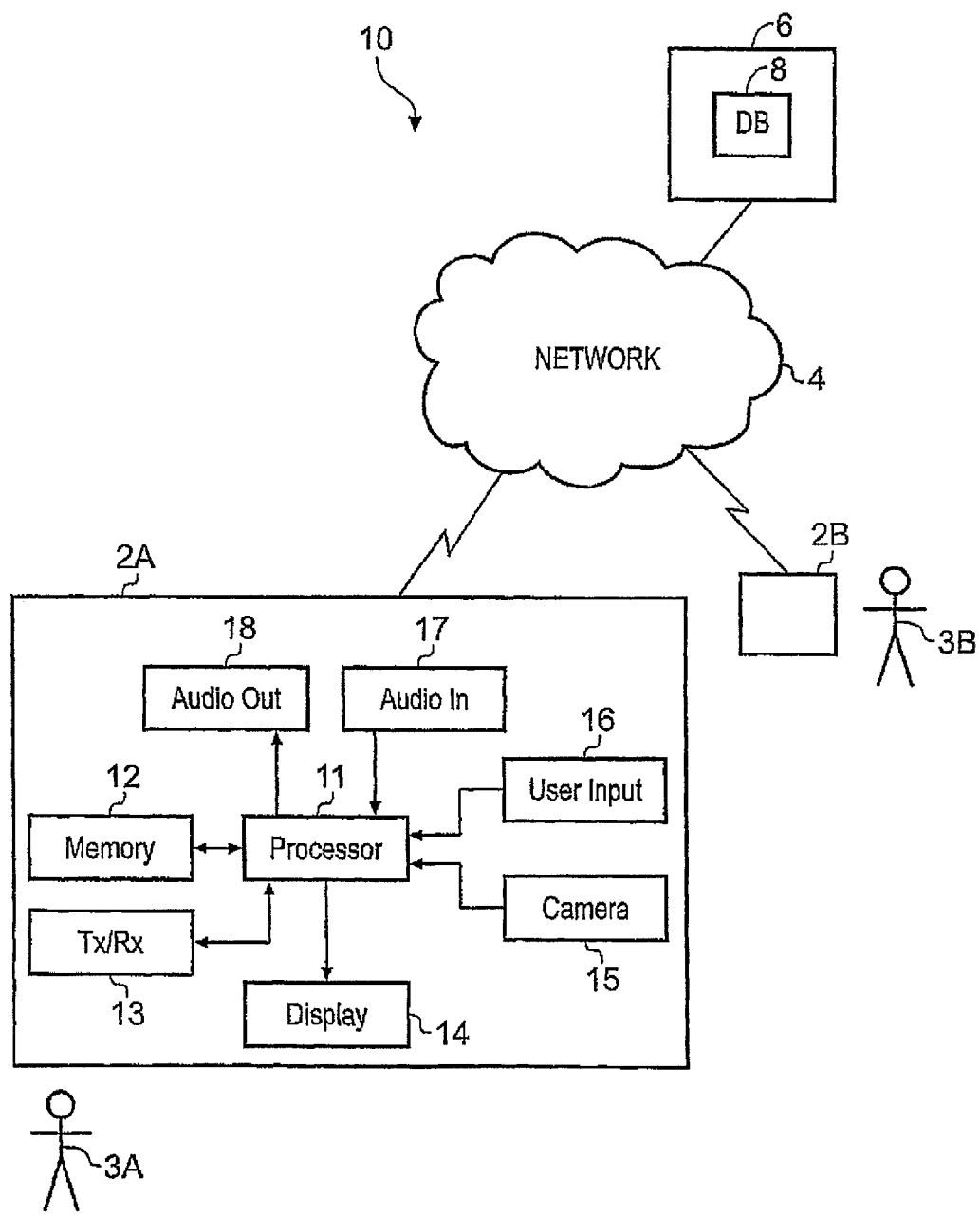
FIG. 1 illustrates a system 10 by which one of a plurality of different users can bind information to any location by taking an image of that location.

FIG. 1 illustrates a system 10 by which one of a plurality of different users can bind information (digital content) to any location in the world by taking an image of that location. The digital content then notionally exists at that location and can be collected by the same user or a different user by taking an image of that location.

A user 3A uses a mobile imaging device 2A to capture an image of a location. The mobile imaging device 2A is in this example network enabled and it can operate as a client to a server 6. It communicates with the server 6 via a network 4. The imaging device 2A may, for example, be a mobile cellular telephone that operates in a mobile cellular telecommunications network 4.

In this example, the mobile imaging device comprises a processor 11 that writes to and reads from memory 12 and receives data from and sends data to radio transceiver 13 which communicates with the network 4. The processor 11 receives input commands/data from an audio input device 17 such as a microphone, a user input device 16 such as a keypad or joystick and a digital camera 15. The processor 11 provides commands/data to a display 14 and an audio output device 18 such as a loudspeaker. The operation of the imaging device 2A is controlled by computer program instructions which are loaded into the processor 11 from the memory 12. The computer program instructions may be provided via a computer readable medium or carrier such as a CD-ROM or floppy disk or may be provided via the cellular telecommunications network.

The captured image is then uploaded from the client 2A to the server 6 via the network 4 in an Upload Message, which may be an MMS message. The originating user 3A uses the client device 2A to communicate with the server 6 via the network 4 and a target region is defined in the image. The target region is then processed at the server 6 to create a model user image key for that location. The originating user 3A defines digital content that is to be associated with the target region of the captured image. If this digital content is stored at the client device 2A it is uploaded to the server 6. The server 6 comprises a database 8 that links model user image keys with their associated digital content.

The same user 3A or a different user 3B can subsequently obtain the digital content associated with a location (if any) by capturing an image of the location, using their respective imaging device 2A, 2B, and by sending the image to the server 6 in a Request Message which may be an MMS message. The server 6 responds to this message by creating a scene user image key for the image received in the Request Message. It then searches its database 8 to see if the scene user image key corresponds to a model user image key stored in the database 8. if there is correspondence, the digital data linked by the database 8 to the corresponding model user image key is obtained.

For non augmented reality digital content, the scene user image key simply acts as a trigger for downloading the obtained digital content to the requesting client device 2A, 2B. For augmented reality content, the captured image received in the Request Message is used as a coordinate system to place the obtained digital content within the image and the augmented image is returned to the requesting client device. For augmented reality content, the user defines an area where the digital content is to appear when the digital content is defined. This area may correspond to the target region.

If certain digital content is notionally associated with a location, then any user 3A, 3B may be able to augment the digital content associated with that location with additional digital content. An image of the location is captured and the captured image is uploaded from the client 2A, 2B to the server 6 via the network 4 in an Update Message, which may be an MMS message. The server 6 responds to this message by creating a scene user image key for the image received in the Update Message. It then searches its database 8 to see if the scene user image key corresponds to a model user image key stored in the database 8. If there is correspondence, the digital data linked by the database 8 to the corresponding model user image key is, obtained and augmented with the additional digital content.

It should be appreciated that although in the preceding description user image key creation occurred at the server 6, it is also possible to have the client device 2A, 2B perform this process.

It should be appreciated that although a system 10 has been described, the invention may also be used wholly within a single device. For example, a single device may operate as both client and server, with the database 6 being stored in the device. The Upload message, Request Message and Update Message would then be messages transmitted within the device as opposed to externally transmitted MMS messages.

It should be appreciated that although a single device may operate as a imaging device and a client device, in other implementations they may be separate devices.

The implementation of the invention is described in more detail in FIGS. 2 to 6.

Figure 2:
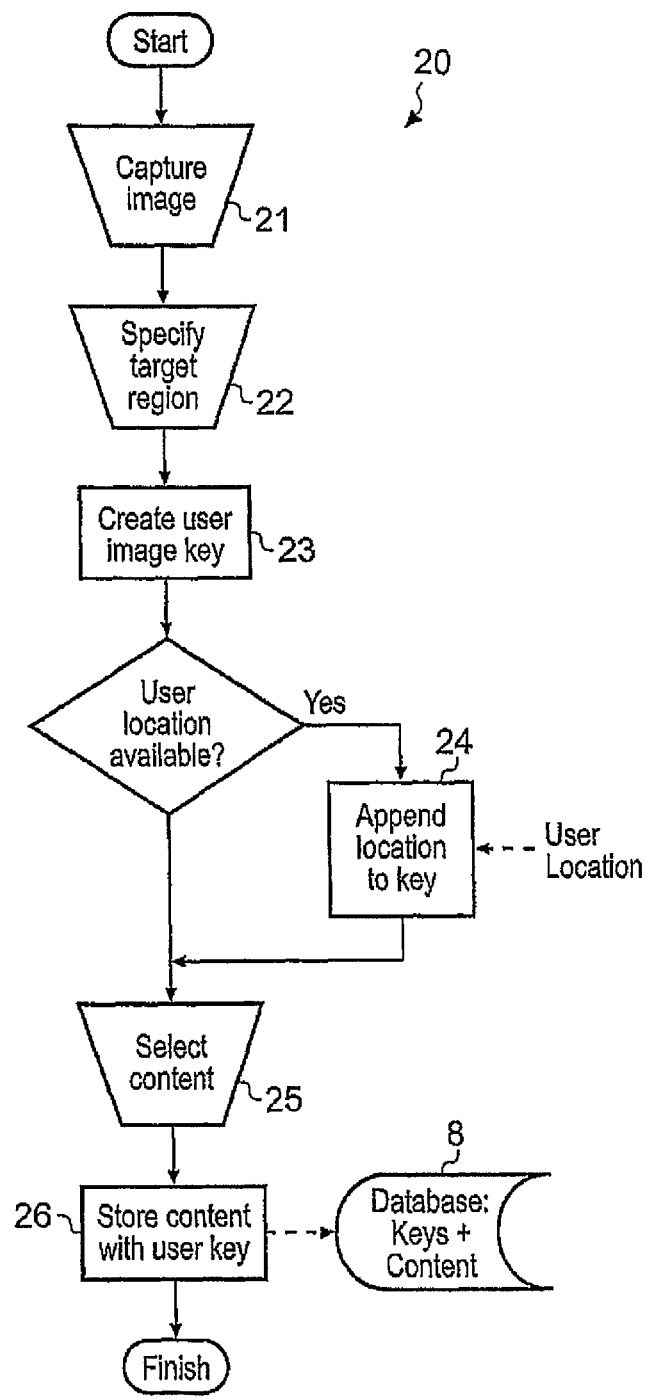
FIG. 2 presents the process 20 for creating a new model user image key from an image captured by a user and for associating information with this key.

FIG. 2 presents a process 20 for creating a new model user image key from a 'model' image captured by a user and for associating digital content with this key.

To place digital content at a new location in the world a 'model' image of that location is captured by a user 3A using the imaging device 2A at step 21.

The user will usually intend for digital content to be associated with an object present in the captured image or a part of the captured image rather than the complete image. For example the user might wish to associate content with a sign or poster present in the image. The user, at step 22, defines the target region to be associated with digital content.

If augmented content is to be used at this target and the aspect ratio of the content is to be preserved in the rendering then the aspect ratio of the target region, that is the ratio of its width to its height, must be known. This can either be supplied by the user or estimated from the shape of the target region.

If the imaging device 2A is a networked mobile device then this device may be used to define the target region. If the imaging device is a digital camera, then the captured image is loaded into software running on a desktop computer or similar to allow definition of the target region.

The user 3A may manually define the target region of interest in the captured image by positioning four corner points on the image to define a quadrilateral. The points may, for example, be positioned via a simple graphical user interface that allows the user to drag the corners of a quadrilateral. In one implementation, on a mobile telephone, four keys 2, 8, 4, 6 of a keypad, such as an ITU standard keypad, are used to move the currently selected point respectively up, down, left or right. Another key, for example the 5 key, selects the next corner with the first corner being selected again after the last. A further key, for example, the 0 key indicates that the target region is complete. An alternative method for positioning the points is to have the user move the mobile telephone so that displayed cross-hairs point at a corner point of the quadrilateral and press a key to select. The mobile telephone determines which position in the previously captured image corresponds to the selected corner region.

A semi-automatic process can be employed in which an algorithm is used to find quadrilateral structures in the image and propose one or more of these as potential target regions. The user can then simply accept a region or else elect to define the region entirely manually.

If the shape of the target region quadrilateral is defined manually by the user it may be constrained to be one that is in agreement with the image perspective to aid the manual selection process. The captured image is processed to determine the "horizon" where parallel structures in the captured image intersect. The parallel sides of the quadrilateral target region are positioned in the image so that they also intersect at the horizon.

A model user image key for indexing the content database is then automatically created at step 23 using the image just captured by the user. Only parts of the image contained within the target region defined in the previous stage are used in key creation.

An image key contains: the captured image and interest points extracted by processing the image. It, in this example, also contains statistical parameters associated with the image interest points and, optionally, a description of the location of the image in the world.

Various methods can be used to determine interest points. For example, *Hartley and Zisserman* ("Multiple View Geometry in Computer Vision", Richard Hartley and Andrew Zisserman, Cambridge University Press, second edition, 2003) s4.8 use interest points defined by regions of minima in the image auto-correlation function. Interest points may also be defined using Scale invariant Feature Transform (SIFT) features as described in "Distinctive Image Features from Scale-Invariant Keypoints", David G. Lowe, International Journal of Computer Vision, 60, 2 (2004), pp. 91-110.

The statistical parameters are adaptive. They are initially assigned a default value but become updated when the model user image key successfully matches new scene user image keys in the future.

If the location of the user 3A is known when capturing the image then this is stored as part of the model user image key at step 24. The location may, for example, be derived in a mobile cellular telephone from the Cell ID of the current cell, from triangulation using neighbouring base stations, using Global Positioning System (GPS) or by user input.

At step 25, the user 3A defines the digital content that is to be associated with the captured image. How the user 3A specifies the digital content is application specific. When specifying content for storage the user 3A may select content that exists on their mobile device 2A. This digital content may have been created by the user or by a third party. The digital content may be a static image (and optionally an alpha mask needed for image blending), a static 3d model, video, animated 3d models, a resource locator such as a URL, sound, text, data etc.

If the digital content is to be used in augmented reality, then it is additionally necessary for a user to specify where in the imaged location the digital content should appear. The user may separately define an area using a quadrilateral frame on the captured image for this purpose. However, in the described implementation the target region is used to define the area.

At step 26, the digital content is stored in the database 8, indexed by the created model user image key.

Figure 3:
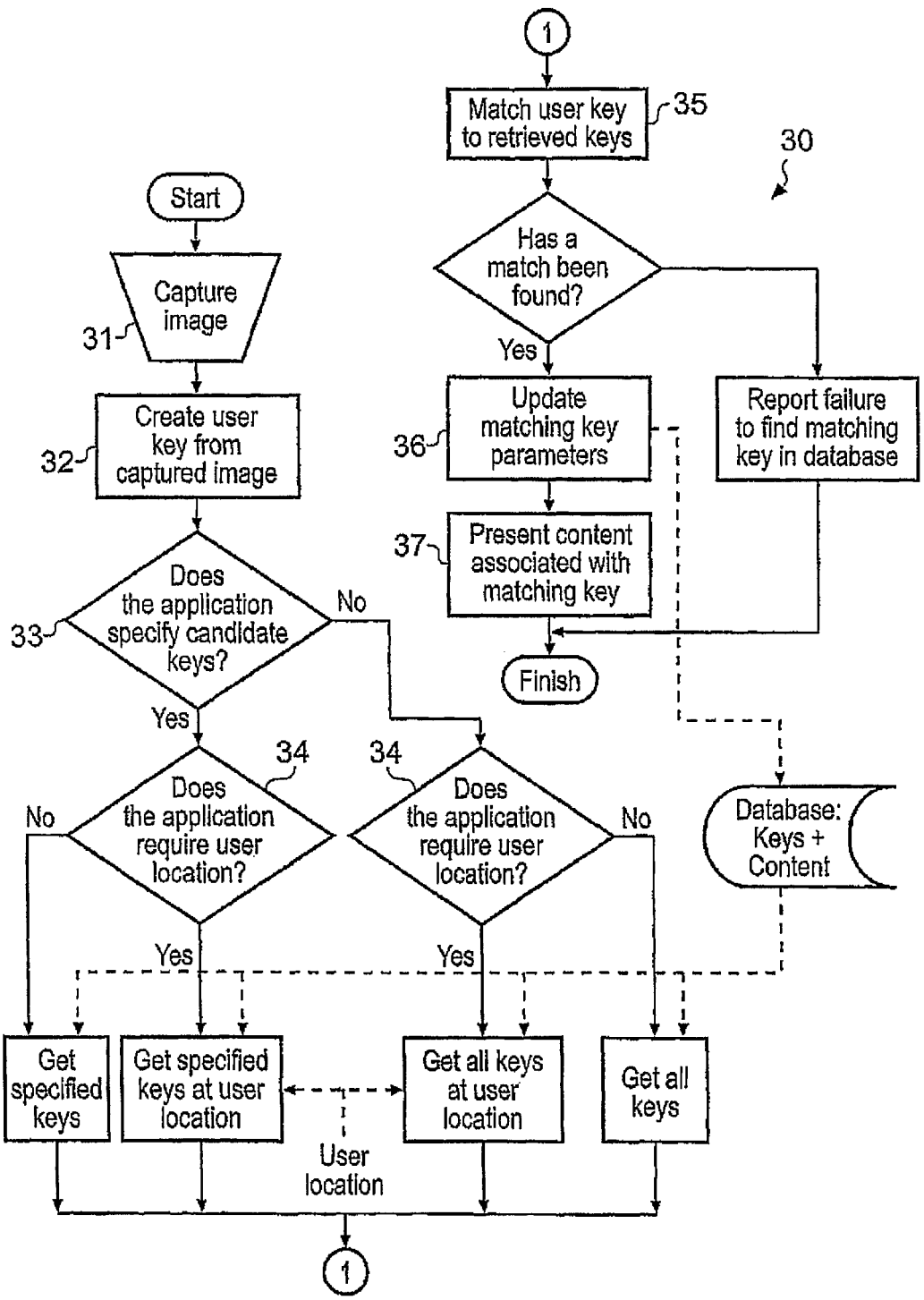
FIG. 3 presents the process for retrieving information from the database 8 using an image captured by a user.

FIG. 3 presents the process for retrieving digital content from the database 8 using a scene image captured by a user.

To retrieve digital content associated with a particular location in the world an image of that location is captured by a user 3A, 3B in step 31 using an imaging device 2A, 2B. In general this will be done on a networked mobile device but this could also be done on a sufficiently powerful network-less device if the database 8 is stored on and the processing run on the device.

At step 32 a scene user image key is created using the captured image. The process is the same as described for step 23 in FIG. 2 except that the whole image rather than a part (the target region) of the captured image is processed to determine the interest points. The location information includes the current location of the imaging device when the image was captured, if known. The created scene user image key is sent to the database 8 in a Request message.

Although statistical parameters may be included in a scene user image key they are not generally adaptive in this implementation as they are for a model image key.

The request message may also contain an application identifier. A particular application might only be concerned with a small subset of the model user image keys in the database in which case only the relevant keys need to be considered. The application identifier enables this subset to be identified as illustrated in step 33. For example, a treasure hunt application might only require the user to visit a small number of particular locations even though the database contains many more keys for other applications. By considering only the relevant keys both the computation load of matching keys and the potential for error is reduced.

The number of model user image keys in the database 8 that are to be compared to the received image key may be reduced by considering only those stored image keys that have a location the same as or similar to the user image key in the query. This process is illustrated in step 34. The use of location information may be application dependent. For example, in a game where a user collects images of generic road signs the application is not concerned about the location of the sign but only its appearance.

Although in FIG. 3 step 34 follows step 33, in other implementations step 34 may precede step 33.

The sample of model user keys from the database that are to be used for comparison with the current scene user key may consequently be constrained by the application used and/or by the location associated with the scene user image key or may be unconstrained. The four alternative are illustrated in the Figure.

At step 35 it is attempted to find a match between the scene user image key created at step 32 and a model user image key from the sample of model user image keys from the database 8. Matching the scene user image key to a model user image key stored in the database involves finding an homography, $H_{ms}$, that aligns a significant number of the interest points of the scene user image key with interest points in one of the model user image keys stored in the database. It is possible but not necessary for the scene image to contain all of the target region of the model image. The scene image need only contain a reasonable proportion of the model image. A suitable process 40 is illustrated in more detail in FIG. 4. It uses the Random Sample Consensus (RANSAC) algorithm which is described in *Hartley and Zisserman* s 4.8 and algorithm 4.6 the contents of which are incorporated by reference. The homography produced by RANSAC maps pixels from one image to another image of the same planar surface and enables the recognition of objects from very different viewpoints.

Figure 4:
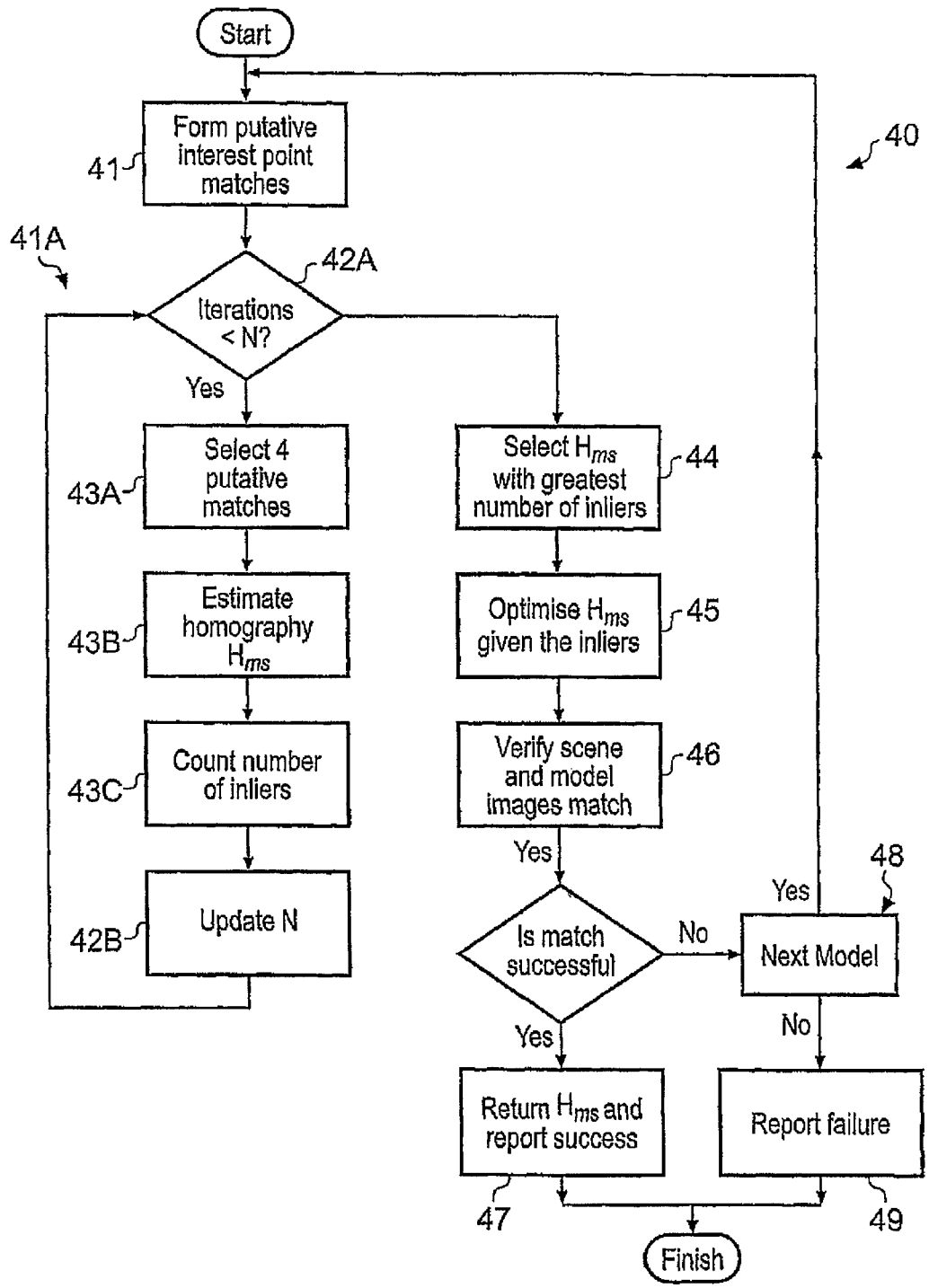
FIG. 4 illustrates a process for finding an homography, $H_{ms}$, that aligns a significant number of the interest points of the scene user image key with interest points in one of the model user image keys stored in the database.

Referring to FIG. 4, at step 41 a set of putative correspondences between the interest points of the scene user image key (scene interest points) and the interest points in a first one of the model user image keys stored in the database (model interest points) is determined. Typically, each scene interest point may match to multiple model interest points and vice versa. It is useful to filter the putative matches so that at most one match exists for each interest point. This can be done by ordering the putative matches into a list with the best matches occurring first. The list is then descended and a record is made of which scene and model interest points have been encountered. If a putative match is found in the list for which the scene or model interest point has already been encountered then the match is removed from the list.

The RANSAC algorithm is applied to the putative correspondence set to estimate the homography and the correspondences which are consistent with that estimate.

The process is iterative, where the number of iterations N is adaptive. A loop is entered at step 42A. The loop returns to step 42A, where a loop exit criterion is tested and the criterion is adapted at step 42B which is positioned at the end of the loop before it returns to step 42A.

In each loop iteration, a random sample of four correspondences is selected at step 43A and the homography H computed at step 43B. Then, a cost (distance) is calculated for each putative correspondence under the computed homography. The cost calculates the distance between an interest point and its putative corresponding interest point after mapping via the computed homography. The support for the computed homography is measured at step 43C by the number of interest points (inliers) for which the cost is less than some threshold. After the loop is exited, the homography with most support above a threshold level is chosen at step 44. Further step 45 may be used to improve the estimate of the homography given all of the inliers. If the support does not exceed the threshold level then the process moves to step 48.

An additional verification phase may occur after step 45 at step 46 to ensure that the image (scene image) associated with the scene user image key matches the image (model image) associated with the found model user image key, rather than just the interest points matching. Verification is performed by matching pixels in the target region of the model image with their corresponding pixels in the scene image. The correspondence between model and scene pixels is defined by the model to scene homohraphy $H_{ms}$ defined earlier. Our preferred implementation is based on the normalised cross correlation measure of the image intensities because this is robust to changes in lighting and colour. The normalised cross correlation measure (NCC) is calculated as follows:

$$NCC = \frac{\Sigma I_m^2(x, y)}{\sqrt{\Sigma I_m^2(x, y) \Sigma I_s^2(H_{ms}[x, y])}}$$

Where $I_m(x,y)$ is the intensity of a model image pixel at location (x,y) and $I_s(x,y)$ is the intensity of a scene image pixel at location (x,y). The intensity of an image pixel is simply the average of the pixels colour values, usually $I(x,y)=[R(x,y)+(G(x,y)+B(x,y)]/3$. The summation is done over all pixel locations in the model image that are (1) contained within the model target region and (2) lie within the bounds of the scene image when mapped using the homography $H_{ms}$. Condition (2) is necessary since the scene image may only contain a view of part of the model target region. Verification is successful if the NCC measure is above a specified threshold. In our implementation we used a threshold of 0.92. If verification is successful, then $H_{ms}$ is returned at step 47. If verification is unsuccessful the process moves to step 48.

At step 48, the model image is updated to the next model image and the process returns to step 41. At step 41 a set of putative correspondences between the interest points of the scene user image key (scene interest points) and the interest points in the new model user image key (model interest points) is determined and then the loop 41A is re-entered. If there are no remaining untested model user image keys in the database at step 48, then the process moves to step 49 where a failure is reported.

Thus the RANSAC process is repeated for each possible model user image key in the database until the support for a chosen homography exceeds a threshold and the scene image and corresponding model image are verified. Such a match indicates a match between the model user image key associated with the chosen homography and the scene user image key.

In the preceding description, it has been assumed that the loop 41A, is exited only when N iterations have been completed. It other implementations, early termination of the loop 41A is possible if the number of inliers counted at step 32C exceeds a threshold. In this implementation, if the verification fails at step 46 then the process moves to step 42B in loop 41A if the loop 41A was terminated early but moves to step 48 if the loop 41A was not terminated early.

Returning to FIG. 3, after a match has been found between a scene user image key and a model user image key, the statistical parameters of the model image key are updated at step 36 (step 47 in FIG. 4). Then at step 37 the digital content associated with the matched model user image key is obtained from the database 8.

In the update at step 36 the following model image key statistics are determined from the previous M successful matches of the model. These statistics are used to improve the performance of the RANSAC matching algorithm.
 1. For each model interest point, the mean and variance of the distance (cost) between the model interest point and the corresponding matching scene image point when mapped back into the model image.
 2. The frequency of a model interest point being an inlier in a matched scene image When a model has successfully matched to a scene there is a correspondence between model interest points and scene interest points and an estimated homography, $H_{ms}$, that maps model coordinates to scene coordinates. Similarly, the inverse of $H_{ms}$, namely $H_{sm}$, maps scene coordinates to model coordinates. In an ideal situation this mapping will map scene interest points to the exact position of their corresponding model interest point. In practice there will be some variation in this position. For each model interest point we measure the mean and variance of the positions of corresponding scene image points when mapped back into the model image.

This statistic is used in the RANSAC algorithm to determine whether a putative match between a model interest point and a scene interest point is an inlier given an homography. As described in the RANSAC algorithm earlier the classification of a putative match as an inlier is done if the distance (cost) between the model and scene positions is below a specified distance threshold. Rather than setting a fixed distance threshold we use the measured mean and variance. A putative match is classified as an idler if the scene interest point, when mapped by the homography into the model image, is within 3 standard deviations of the mean.

The RANSAC algorithm may be improved by recording and using the frequency of matching correspondence for each interest point of a model image. The frequency of matching correspondence is the frequency with which each interest point of the model user image key has a correspondence with an interest point of a matching scene user image key ie. the frequency at which each model interest point is classified as an inlier when the model has been successfully matched. The frequency of matching correspondence is calculated in FIG. 4 at step 47 (step 36 in FIG. 3). This frequency of matching correspondence is then stored in the statistical parameters of the matching model user image key. The sample of the four correspondences made at step 43A may be a weighted random selection. The probability of selecting an interest point of the model is weighted according to its frequency of matching correspondence. The higher the frequency of matching correspondence the greater the weighting and the greater the probability of its selection. In our implementation weighted sampling reduces the number of iterations necessary to find a good homography by a factor of 50 on average. This also filters out erroneous and unreliable model interest points from the matching process and also from future matching processes involving different scene images. When using a weighted random selection of interest points the weights should be considered when calculating the number of iterations N at step 42B. In the referenced text, *Hartley & Zisserman Algorithm* 4.5, the probability that an taller point is selected, w, assumes uniformed random selection and is defined as the ratio of the number of inners to the total number of points. To account for the weighted sampling this is trivially reformulated as:

$$w = \frac{\sum_{i \in inlier\ points} W_i}{\sum_{i \in all\ points} W_i}$$

Where $W_i$ is the weight associated with the $i^{th}$ interest point. When all $W_i$s are constant this is equivalent to the original formulation in the referenced text.

Figure 5:
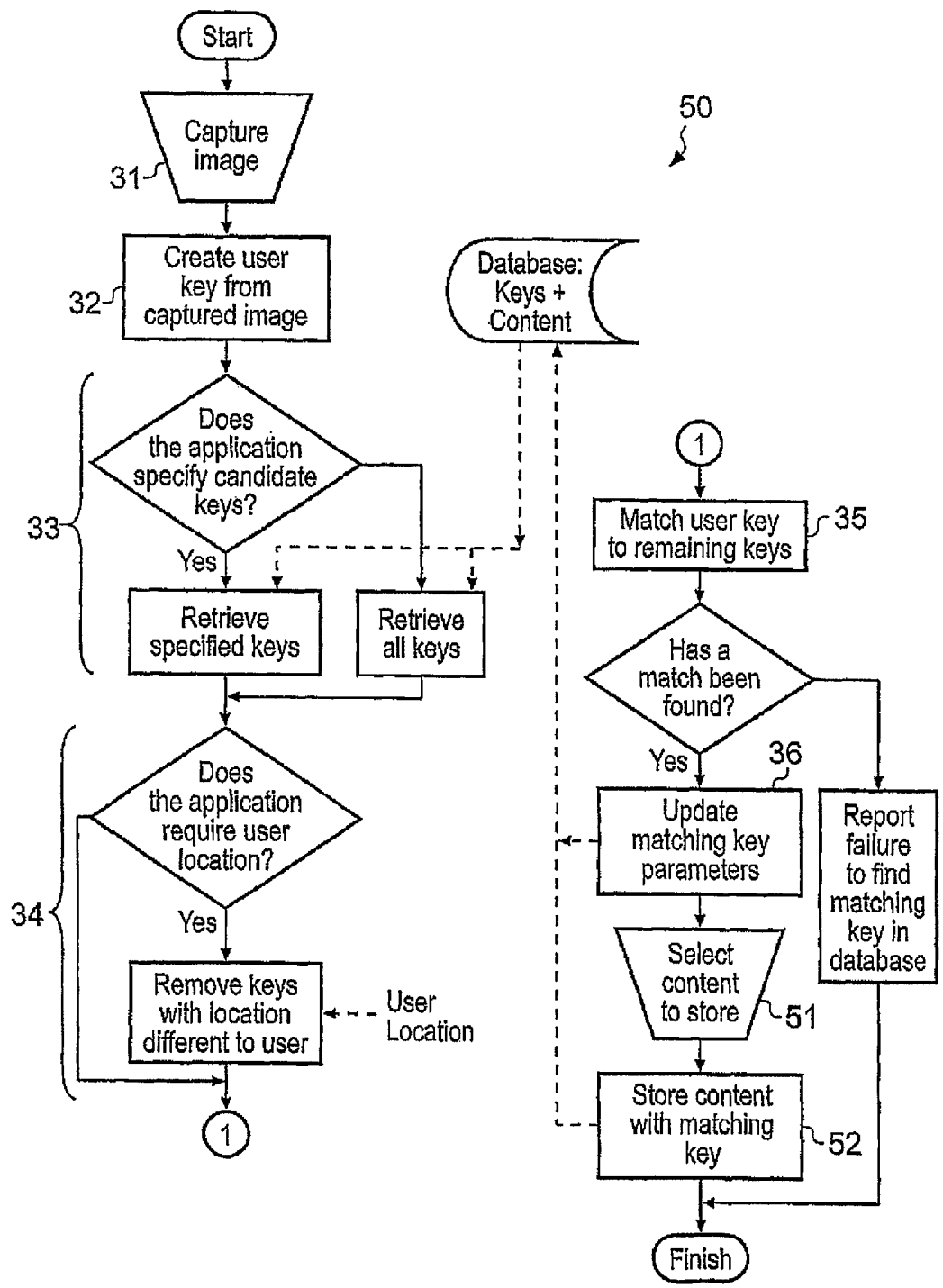
FIG. 5 presents the process 50 for adding new information to a model user image key already in the database 8 given an appropriate image captured by a user.

FIG. 5 presents the process 50 for adding new digital content to a model user image key already in the database 8 given an appropriate image captured by a user. This process is largely the same as that described in FIG. 3 (differences at steps 51, 52) and similar references numbers denote similar steps. However, step 37 is replaced by steps 51 and 52. At step 51, the additional digital content for storage in association with the matched model user image key is defined and at step 52 this additional digital content is stored in the database where it is indexed by the matched mode user image key.

Figure 6:
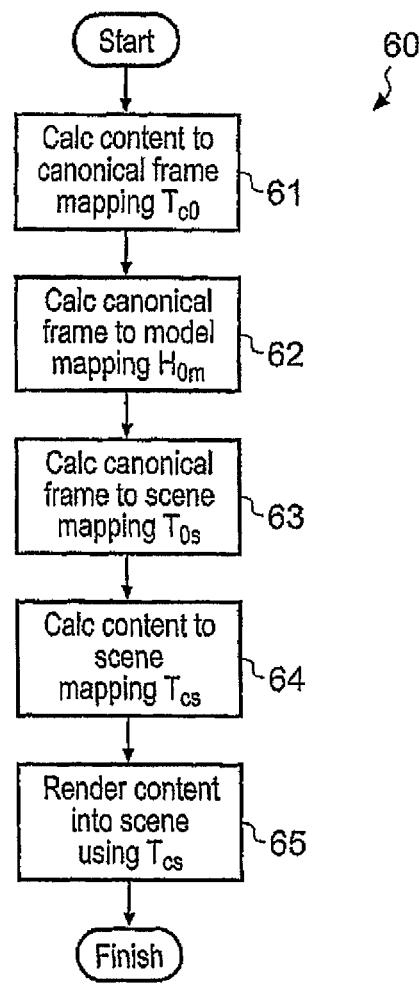
FIG. 6 illustrates the process of augmenting the image captured by the user with information.

The process of augmenting the image captured by the user with the image digital content obtained from the database in step 37 of FIG. 3 is illustrated in FIG. 6. Rendering the digital image augmented with the digital content comprises two distinct phases. First the content to scene mapping is determined. This maps pixels (in the case of image based content), 2d vertices (in the case of 2d vector drawings) or 3d vertices (in the case of 3d models) from model coordinates to scene coordinates. Next this mapping is used to render the image content into the scene.

At step 61, a digital content to canonical frame mapping $T_{c0}$ is calculated. It is convenient to define an intermediate canonical frame when determining the mapping of content to the scene The canonical frame is a rectangular frame with unit height and a width equal to the aspect ratio of the rectangular piece of the world defined by the target region. Aspect ratio is defined as the ratio of width to height, i.e., width/height.

The purpose of this mapping it to appropriately scale and position the digital content so that it appears correctly when finally rendered into the scene image. For the purpose of our implementation we transform the content so that:
1. It is at the largest possible scale that fits into the target region detected in the scene image
2. The contents aspect ratio is preserved
3. The content is centred either horizontally or vertically to balance out any remaining space.

If a point in the digital content frame is given by $p_c$ then the equivalent point $p_0$ in the canonical frame is given by the expression:

$$P_0 = T_{c0} p_c$$

For 2d content $T_{c0}$ is a 3×3matrix and content and canonical points are defined in homogeneous coordinates as 3 element column vectors:

$$P_0 = [x_0\ y_0\ 1]^T$$

$$p_c = [x_c\ y_c\ w_c]^T$$

The mapping $T_{c0}$ is given by the expression:

$$T_{c0} = \begin{bmatrix} s & 0 & \frac{w_0 - sw_c}{2} \\ 0 & s & \frac{1 - sh_c}{2} \\ 0 & 0 & 1 \end{bmatrix}.$$

Where s is the scale factor given by the expression:

If $(w_c/h_0 > w_0)$ then $s = w_0 w_c$ otherwise $s = 1/h_c$

Where $w_c$ is the width of the content, $h_c$ is the height of the content and $w_0$ is the width of the canonical frame (which is also the aspect ratio of the target location).

For 3d content $T_{c0}$ is calculated in an analogous way but it is now a 4×4 matrix and the content vertices are 3d points represented in homogeneous coordinates by 4 element column vectors.

At step 62, the canonical frame to Model Mapping $H_{0m}$ is calculated. This mapping takes the four corners of the rectangular canonical frame and maps them to the four vertices of the target region quadrilateral of the model image. Since all points lie on planes this mapping can be described by a 3×3 homography matrix and can be determined using the direct linear transformation (DLT). Note again that the 2d vertex coordinates are described in homogeneous coordinates using 3 element column vectors. The DLT algorithm for calculating an homography given four points is described by *Hartley and Zisserman* in s. 4.1. and algorithm 4.1, the content of which are hereby incorporated by reference.

At step 63, the canonical frame to scene Mapping $T_{0s}$ is calculated. For 2d content the mapping from the canonical frame to the scene is simply determined by concatenating the mapping from the canonical frame to the model and the mapping from the model to the scene. The mapping from the model to the scene is the output of the image key matching process 40 and is given by the homography $H_{ms}$. The mapping from the canonical frame to the scene is still an homography and is given by the expression:

$$T_{0s} = H_{ms} H_{0m}$$

For 3d content T0s is a projection from 3d to 2d represented by a 3×4 element matrix. This can be determined using standard techniques for camera calibration such as the DLT. Camera calibration requires a set of corresponding 3d vertices and 2d points for which we use the 2d scene and model interest points and the 2d model interest points mapped into the canonical frame and given the extra coordinate z=0.

At step 64, the content to scene mapping $T_{os}$ is calculated by combining the mappings calculated in steps 63 and 61.

$$T_{cs} = T_{0s} T_{c0}$$

At step 65, the digital content is rendered into the Scene using $T_{cs}$. For 2d content the content to scene mapping is used directly to draw the content into the scene. There are many algorithms in the literature to do this for image and vector type graphics. One example, for rendering image content is to iterate over every pixel in the scene target region and calculate the corresponding pixel in the content frame using the inverse of the content to scene transformation. To avoid aliasing we perform bilinear sampling of the content to determine the value of the pixel to render into the scene. Our system also supports the use of an alpha mask which can be used to blend the scene and content pixels to create effects such as transparency and shadows. The alpha mask is simply a greyscale image with the same dimensions of the content and it is used in the standard way to blend images.

The rendering of 3d content is performing using standard 3d rendering software such as OpenGL or DirectX. The mapping $T_{0s}$ defined above is analogous to the camera matrix in these rendering systems.

Another application of the invention is in 'texture mapping'. In this case, digital content is associated with an image portion that may appear in many captured images. The image portion, when it appears in a captured image, triggers the augmentation of the captured image using the digital content.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An electronic user device comprising:
   a processor; and
   a memory including computer program code, wherein the memory, computer program code and processor are configured:
   to enable definition, by a user of the electronic user device, of user-defined information for access by multiple users via association at a server with at least a first portion of a first image, wherein the user-defined information augments first user-defined information already associated at the server with at least the first portion of a first image for access by multiple users; and
   to enable using a captured second image that includes a portion corresponding to at least the first portion of the first image to access, at the server via a network, the user-defined information previously defined by the user of the electronic user device and associated at the server with at least a first portion of a first image and the first user-defined information associated at the server with at least the first portion of the first image, and to receive in reply the accessed user-defined information previously defined by the user of the electronic device and the first user-defined information.

2. An electronic user device as claimed in claim 1, wherein the second image includes a portion corresponding to at least the first portion of the first image if interest points extracted from the portion of the second image match interest points extracted from the first image.

3. An electronic user device as claimed in claim 1, wherein the memory, computer program code and processor are configured: to output the accessed information.

4. An electronic user device as claimed in claim 1, wherein the memory, computer program code and processor are configured: to enable user selection of an area, at least a portion of which is the first portion, in the first image with which the user-defined information is associated.

5. An electronic user device as claimed in claim 1, wherein the memory, computer program code and processor are configured: to enable composition by the user of the user-defined information.

6. An electronic user device as claimed in claim 1, wherein the captured second image is sent with an application identifier that causes a subset of a database to be searched by the server.

7. An electronic user device as claimed in claim 1, wherein the user-defined information is text.

8. An electronic user device as claimed in claim 1, comprising a radio transceiver for communication with a cellular telecommunications network, wherein the computer program code is provided via the cellular telecommunications network.

9. A method of storing user-defined information for future access by multiple parties comprising, at a server controlled by a third party:
   receiving from a first originating party user-defined information that is defined by the first originating party and is for access by multiple parties; and
   associating the user-defined information received from the first originating party and at least a first portion of a first image in a database, wherein the user-defined information augments first user-defined information already associated at the server with at least the first portion of a first image in the database; and
   providing access by a second party to the user-defined information and the first user-defined information, when a second image, captured by the second party, includes a portion corresponding to at least the first portion of the first image.

10. A method as claimed in claim 9, further comprising:
    providing access by a further party, using a captured third image that includes a portion corresponding to at least the first portion of the first image, to the user-defined information.

11. A method as claimed in claim 9, further comprising:
    extracting interest points from the portion of the second image;
    extracting interest points from the first image;
    providing access by a second party to the user-defined information, when the interest points extracted from the portion of the second image matches the interest points extracted from the first image.

12. A method as claimed in claim 9, wherein the first image is received from the first originating party and/or wherein the first image is received via a network (4) in a message.

13. A method as claimed in claim 9, wherein the user-defined information is text.

14. A method as claimed in claim 9, further comprising:
    processing a target region of the first image defined by the first originating party to create a model user image key; and
    linking the created model user image key with the user-defined information in the database.

15. A method as claimed in claim 14, further comprising:
    creating a scene user image key for the captured second image; searching the database for correspondence between the created scene user image key and a model user image key stored in the database; and
    if there is correspondence, obtaining the user-defined information linked to the corresponding model user image key.

16. A server for control by a third party comprising:
    a processor; and
    wherein the memory, computer program code and processor are configured:
    to receive user-defined information from a first user different to the third party for access by multiple parties; and
    to associate the received user-defined information and at least a first portion of a first image in a database, wherein the user-defined information augments first user-defined information already associated at the server with at least the first portion of the first image in the database; and
    to provide access by a remote second user to the user-defined information and the first user-defined information when a second image, captured by the remote second user, includes a portion corresponding to at least the first portion of the first image.

17. A server as claimed in claim 16, wherein the server comprises the database.

18. A server as claimed in claim 16, wherein the database has a plurality of entries each of which associates one of a plurality of image portions with respective information.

19. A server as claimed in claim 16, wherein the user-defined information is received via a network.

20. A non-transitory computer-readable storage medium encoded with instructions that, when performed by a processor of an electronic device, cause performance of the method of claim 9.

21. An electronic user device comprising:
   means for definition, by a user of the electronic user device, of user-defined information for access by multiple users via association at a server with at least a first portion of a first image, wherein the user-defined information augments first user-defined information already associated at the server with at least the first portion of a first image for access by multiple users; and
   a camera for capturing a second image that includes a portion corresponding to at least the first portion of the first image; and
   means for using the captured second image to access, at the server via a network, the user-defined information previously defined by the user of the electronic user device and associated at the server with at least a first portion of a first image and the first user-defined information associated at the server with at least the first portion of the first image, and for receiving in reply the accessed user-defined information previously defined by the user of the electronic device and the first user-defined information.

22. An electronic user device as claimed in claim 21, comprising user input means for enabling user selection of an area, at least a portion of which is the first portion, in the first image with which the user-defined information is associated.

23. An electronic user device as claimed in claim 21, comprising means for composing the user-defined information.

* * * * *

UNITED STATES PATENT AND TRADEMARK OFFICE
CERTIFICATE OF CORRECTION

PATENT NO. : 10,445,618 B2  
APPLICATION NO. : 15/634283  
DATED : October 15, 2019  
INVENTOR(S) : Anthony P. Ashbrook and Mark W. Wright Page 1 of 1

It is certified that error appears in the above-identified patent and that said Letters Patent is hereby corrected as shown below:

In the Claims

In Claim 1:
Column 13, Line 18 "a first image" should be deleted and -- the first image -- should be inserted.

In Claim 1:
Column 13, Line 24 "a first portion" should be deleted and -- the first portion -- should be inserted.

In Claim 1:
Column 13, Line 24 "a first image" should be deleted and -- the first image -- should be inserted.

In Claim 9:
Column 14, Line 2 "a first image" should be deleted and -- the first image -- should be inserted.

In Claim 16:
Column 14, Line 44-46 the following language should be deleted: "a processor; and wherein the memory, computer program code and processor are configured:" and the following language should be inserted: -- a processor; and a memory including computer program code, wherein the memory, computer program code and processor are configured: --.

In Claim 21:
Column 15, Line 12 "a first image" should be deleted and -- the first image -- should be inserted.

In Claim 21:
Column 16, Line 2-3 "a first portion" should be deleted and -- the first portion -- should be inserted.

In Claim 21:
Column 16, Line 3 "a first image" should be deleted and -- the first image -- should be inserted.

Signed and Sealed this  
Eighth Day of December, 2020

Andrei Iancu  
*Director of the United States Patent and Trademark Office*